United States Patent [19]
Harris et al.

[11] 4,116,549
[45] Sep. 26, 1978

[54] CONTACT LENS

[76] Inventors: James E. Harris, Rte. 2, Amity Heights, Bristol, Tenn. 37620; Ben D. Parish, Box 758, Greeneville, Tenn. 37743

[21] Appl. No.: 648,011

[22] Filed: Jan. 12, 1976

[51] Int. Cl.$^2$ .............................................. G02C 7/04
[52] U.S. Cl. .................................................... 351/160
[58] Field of Search ................................ 351/160–162

[56] References Cited

U.S. PATENT DOCUMENTS

| | | | |
|---|---|---|---|
| 3,710,796 | 1/1973 | Neefe | 351/160 X |
| 3,767,731 | 10/1973 | Seiderman | 351/160 X |
| 3,900,250 | 8/1975 | Ivani | 351/160 |
| 3,951,528 | 4/1976 | Leeds | 351/160 X |

OTHER PUBLICATIONS

Stahl et al., Article in *Journal of the American Optometric Association*, Mar. 1974, pp. 302–307 cited.

*Primary Examiner*—Paul A. Sacher

[57] ABSTRACT

Disclosed is a cellulose ester contact lens having a medically acceptable warpage tolerance.

3 Claims, No Drawings

CONTACT LENS

This invention relates to a cellulose ester contact lens having a propensity to warp that is small enough to make the contact lens medically acceptable.

Contact lenses are well known in the art and have been used for years. A modern contact lens is basically a small, thin, polished disc that is optically prescribed and ground on the outer side to correct or improve the wearer's vision while the inner side is carefully prescribed and designed to be compatible with the surface shape of the wearer's eye.

Originally, contact lenses were constructed of glass. Subsequently, several kinds of plastics where used to manufacture contact lenses. For example, contact lenses of silicone type plastics, gel type plastics, and poly(methyl methacrylate) are well known in the art. Recently, contact lenses of cellulose acetate butyrate have been disclosed in U.S. Pat. No. 3,900,250.

Cellulose acetate butyrate contact lenses, such as disclosed in U.S. Pat. No. 3,900,250, offer a desirable balance of properties, including desirable oxygen permeability and a hydrophylic character. Although cellulose acetate butyrate contact lenses are desirable because of a number of properties, contact lenses of cellulose acetate butyrate of the type known in the art and described in U.S. Pat. No. 3,900,250 are not medically acceptable because the contact lens changes shape upon wearing because the contact lens is exposed to water in the eye of the wearer. This change of shape is often called warpage by those skilled in the art.

The change of shape, or warpage, of a contact lens typically either results in the contact lens "flattening out" or "bowing up". Although applicants are unsure precisely what phenomenon causes the warpage of the contact lens, one theory of particular merit is that the warpage pattern results from internal stress in the plastic and reflects the manner in which the contact lens blanks were prepared. The blanks from which the contact lens of this invention can be prepared can be either extruded, injection molded or compression molded. Depending upon the type of forming process chosen, internal stresses tend to exist in the blank which are located in either random or substantially uniform patterns. Depending upon the nature of the pattern, the resultant lens may tend to "flatten out" or "bow up" into a boat-like form and depart from being a portion of the surface of a sphere. Typically, the amount of warpage corresponding to the "bowing up" or "flattening out" is so great as to render the contact lens totally medically unacceptable for correcting vision.

Applicants have now discovered a cellulose ester contact lens that exhibits so little warpage as to be completely medically acceptable for correcting vision.

The propensity of the contact lens of this invention to warp can be regarded as the warpage tolerance of the contact lens. In regard to this invention, the term "warpage tolerance" means the change in the radius of a circle on the inner surface of the contact lens passing through the center of the inner surface of the contact lens. The warpage tolerance is measured by measuring the radius of a circle on the inner surface of the contact lens passing through the center of the contact lens and then performing the same measurement after warpage occurs. The warpage tolerance is the difference between the first and second radii.

Broadly, the contact lens of applicants' invention exhibits a warpage tolerance of not greater than 0.10 mm. More specifically, the contact lens of this invention has a warpage tolerance in the range of 0 to 0.04 mm.

The cellulose ester contact lens of this invention is thought to be patentable over cellulose esters lenses of the prior art, including the cellulose acetate butyrate lens disclosed in U.S. Pat. No. 3,900,250, because the contact lens of this invention has a propensity to warp that is so small that the contact lens is medically acceptable and the warpage propensity of the typical contact lens of the prior art is so large as to render the contact lens medically unacceptable.

The cellulose ester contact lens of applicants' invention having a warpage tolerance not greater than 0.10 mm. can be prepared by an antiwarping treatment comprising exposing the contact lens blank to a suitable elevated temperature for a suitable length of time prior to machining and grinding. Preferably, the blank is supported during the antiwarping treatment in such a manner as to allow freedom for the blank to change shape. Unless the blanks are exposed to an antiwarping treatment in accordance with applicants' invention, the contact lens will not have a warpage tolerance not greater than 0.10 mm. and will typically have a medically unacceptable warpage.

The temperature used for the antiwarping treatment can vary widely depending on the particular cellulose ester and the amount of warpage tolerance sought to be obtained. For example, when the cellulose ester is cellulose acetate, the temperature is typically at least 125° C. When the cellulose ester is cellulose acetate butyrate, the temperature is typically at least 115° C. When the cellulose ester is cellulose acetate propionate, the temperature is typically at least 135° C. The maximum temperature that can be used is governed by the boiling point of additives in the cellulose ester, such as plasticizers and stabilizers, and or the thermal decomposition point of the cellulose ester. Temperatures at the boiling point of additives typically result in bubble formation. Temperatures at the thermal decomposition point of the cellulose ester typically result in degradation of the cellulose ester. When the cellulose ester is cellulose acetate the maximum temperature is about 135° C. When the cellulose ester is cellulose acetate butyrate the maximum temperature is about 135° C. When the cellulose ester is cellulose acetate propionate the maximum temperature is about 145° C. In a more preferred embodiment the temperature can be from 130° to 134° C. when the cellulose ester is cellulose acetate, from 120° to 124° C. when the cellulose ester is cellulose acetate butyrate, and from 138° to 142° C. when the cellulose ester is cellulose acetate propionate. Injection molded or extruded blanks generally require greater temperature than blanks cut from compression molded sheets.

The time used for the antiwarping treatment can vary widely depending upon the particular cellulose ester, the hardness of the material, and the amount of warpage tolerance to be obtained. Broadly, the time used for the antiwarping treatment is typically at least over two hours, but shorter times, even as short as 10 minutes, could be used. Preferably the time can be 2 to 6 hours. More preferably, the time can be 4 to 6 hours when the cellulose ester is cellulose acetate, 3 to 5 hours when the cellulose ester is cellulose acetate butyrate, and 2 to 4 hours when the cellulose ester is cellulose acetate propionate. Injection molded or extruded blanks generally require greater times than blanks cut from compression molded sheets. Harder cellulose esters generally require more time than softer cellulose esters.

The pressure used for the antiwarping treatment can vary widely. Typically, atmospheric pressure is used because of the convenience of not having to use a pressure-tight hot environment. The use of pressures greater than atmospheric are often helpful if high temperatures are selected and the cellulose esters contain volatile components, such as plasticizers and stabilizers. Since increased pressure favors not volatilizing the volatile components, increased pressure tends to favor the absence of bubbles in the blanks. If it is not desired to use a pressure greater than atmospheric, then use of lower temperatures will typically eliminate bubbles in the blank.

The antiwarping treatment can be accomplished by placing the contact lens blanks in a suitable hot environment, such as an oven, for the required length of time at the desired pressure. Since it is important to maintain the temperature within precise limits, it is important that the hot environment be uniformly hot so the sensed temperature is the same temperature as the immediate environment of the lens blank. To facilitate uniform heat transfer and to allow freedom for stress relief through shape change, the blank is preferably placed in an inert heat transfer fluid during the antiwarping treatment. The specific gravity of the fluid should be only slightly lower than the specific gravity of the blank. This allows the blank to sink in the fluid while still being supported in an almost freely suspended, weightless condition with freedom to change shape. A silicone type oil is a particularly desirable heat transfer fluid since it will not chemically react with the plastic. Other inert heat transfer fluids of the kind well known in the art can be used. After the treatment, the heat is turned off and the blank is allowed to slowly return to room temperature while remaining in the inert fluid. Cool down time is typically 2 to 4 hours.

The contact lens of this invention has a number of important properties that make the contact lens particularly suitable for use as a contact lens.

One important property of the contact lens of this invention is the surface finish of the contact lens. The contact lens of this invention has a surface finish of at least 600 Å, preferably in the range of 300 to 600 Å. In regard to this invention, the surface finish can be thought of as the smoothness of the surface of the lens and can be determined with an instrument such as the Sloan M100 Angstrometer. The surface finish of the contact lens of this invention can be achieved using a conventional water based $Al_2O_3$ slurry or, more desirably, using an oil based $Al_2O_3$ slurry. When a water based $Al_2O_3$ slurry is used to polish the cellulose ester contact lens of this invention, it is difficult to achieve a surface polish of at least 600 Å because the cellulose ester often absorbs some of the water in the $Al_2O_3$ slurry and softens the blank so that a surface polish of at least 600 Å is difficult to achieve. When an oil based $Al_2O_3$ slurry is used to prepare the contact lens of the invention it is often less difficult to achieve a surface polish of at least 600 Å because the problem of the blank absorbing water is eliminated.

Another important property of the contact lens of this invention is the hardness of the lens. In the embodiment of the invention wherein the contact lens is a harder type lens, the contact lens has a hardness of at least 70 Rockwell R, preferably at least 90 Rockwell R.

It is surprising the contact lens of this invention, having a hardness of at least 70 Rockwell R, could be prepared because harder lens tend to have high warpage tolerance. Applicants have discovered that the the antiwarping treatment permits a suitable contact lens to be prepared with a hardness of at least 70 Rockwell R.

Another property of the contact lens of this invention is the oxygen permeability. The oxygen permeability of the contact lens of this invention is at least $1.0 \times 10^{-11}$, preferably in the range of $4 \times 10^{-11}$ to $$6 \times 10^{-11} \frac{cm.^2}{sec.} \times \frac{ml. O_2}{ml. \text{ solution} \times mm. Hg.} .$$

In this invention the oxygen permeability is measured with a Schema Versatae oxygen flux meter in accordance with the manufacturer's recommended operating procedures. The Schema Versatae oxygen flux meter is manufactured by Schema Versatae, 2203 Fourth Street, Berkeley, California 94710,.

Still another property of the contact lens of this invention is the hydrophylic character of the lens. In this invention the term "hydrophylic character" is used in its general meaning and means a more water tolerant or water loving character compared to less water tolerant.

Still another property of the contact lens of this invention is a stiffness in flexure in the range of $1.2 \times 10^5$ to $1.8 \times 10^5$ psi. determined in accordance with ASTM D-747.

Still another property of the contact lens of this invention is a tear resistance of at least 2, preferably at least 3 grams, determined in accordance with the elmendorf Test for 1 mil. films.

Still another property of the contact lens of this invention is the impact strength. The impact strength of the contact lens of this invention is at least 2, preferably at least $$\frac{3 \text{ ft.} - \text{lb.}}{\text{in.}^2}$$

determined in accordance with ASTM D-256.

Still another property of the contact lens of this invention is a swelling tolerance of less than 3 percent, preferably in the range of 0 to 3 percent. The swelling tolerance is determined using a one-half inch diameter flat disc of material, approximately one-fourth inch thick, first measured for thickness at its center with a standard machinest micrometer. The disc of material is then placed in distilled water at 25° C. ± 2° C. for 48 hours. The thickness of the disc is again measured and the percentage change in thickness calculated.

The cellulose esters useful in this invention can be broadly described as an organic cellulose ester selected from the group consisting of cellulose acetate, cellulose acetate butyrate and cellulose acetate propionate.

The cellulose esters useful in this invention can be more specifically described as an organic cellulose ester selected from the group consisting of cellulose acetate having an acetyl content of 36 to 40 percent by weight of the cellulose acetate, cellulose acetate butyrate having an acetyl content of 11 to 15 weight percent and a butyryl content of 34 to 40, based on the weight of the cellulose acetate butyrate, and cellulose acetate propionate having an acetyl content of 2 to 9 weight percent and a propionyl content of 40 to 49 weight percent, based on the weight of the cellulose acetate propionate.

Preferably, the cellulose ester useful in this invention can be described as a cellulose acetate butyrate having an acetyl content of 13 to 15 weight percent, based on the weight of the cellulose acetate butyrate, a butyryl content in the range of 36 to 38 weight percent, based on the weight of the cellulose acetate butyrate, a hydroxyl content in the range of 1.5 to 2.5 weight percent, based on the weight of the cellulose acetate butyrate, and a viscosity in the range of 17 to 28 seconds as determined by the Ball-Drop Method, ASTM Designation D-1343, Formula A.

The cellulose esters useful in this invention are conventional polymers and have been known in the art for years.

The preparation of a typical contact lens of this invention will now be described in detail.

Granules of a conventional cellulose acetate butyrate within the scope of the invention are either injection molded into one-half inch diameter by one-quarter inch thick discs are compression molded into a one-quarter inch thick sheet and one-half inch diameter disc are cut from the sheet. These discs are often called blanks by those skilled in the art.

The blanks are then subjected to the antiwarping treatment by placing the blanks in a container of Dow Corning 550 silicone oil and then placing the container in a laboratory oven for 4 hours at 120° C. at atmospheric pressure. The blanks are then allowed to cool to room temperature over a 3 hour period while remaining in the oil.

The blanks are then machined using a standard contact lens lathe well known in the art. Lathe cuts are made at a slower rate than required with conventional poly(methyl methacrylate) blanks in order to prevent frictional heating and softening of the lens which will result in an unsatisfactory cut. It is helpful to use a jet of cold air or other inert fluid to lower the temperature of the tool and the lens blank to improve the machinability of the blank.

The machined blanks are then polished using conventional contact lens polishing equipment. As reported earlier, the contact lens of this invention is most desirably polished using a non water based polishing compound, such as a slurry of oil and $Al_2O_3$.

The contact lens of this invention can be either a harder type lens or a softer type lens. Broadly, the contact hardener of this invention includes both the harder and softer type lens. In a preferred embodiment, the contact lens of the invention is a harder type contact lens. Thus, broadly, the properties of the contact lens include a Rockwell R hardness that can be below 70 for the softer lens and can be above 70 for the harder lens. In a preferred embodiment of the invention wherein the contact lens is a harder type contact lens, the Rockwell R hardness is at least 70, preferably at least 90. In a similar manner, broadly the properties of the contact lens include a stiffness in flexure less than $1.2 \times 10^5$ psi. for the softer type lens and a stiffness in flexure in the range of $1.2 \times 10^5$ to $1.8 \times 10^5$ psi. for the harder type lens. In the preferred embodiment of the invention wherein the contact lens is a harder type contact lens, the stiffness in flexure is in the range of $1.2 \times 10^5$ to $1.8 \times 10^5$ psi. The hardness and stiffness in flexure can be controlled by adding an appropriate amount of conventional plasticizer to the cellulose ester. The precise amount of plasticizer depends on the precise properties required and would be readily determinable by those skilled in the art.

The contact lens of this invention has been described as comprised of certain cellulose esters and plasticizers. It will be understood that the contact lens of this invention can contain various materials other than plasticizers, such as pigments, mold release agents, hardeners, and the like. Obviously these materials must not unacceptably alter the properties of the contact lens. Thus, any additional materials must be nontoxic and nonirritating to the cornea.

The contact lens of this invention has been described in detail with particular reference to certain preferred embodiments thereof, but it will be understood that variations and modifications can be effected within the spirit and scope of the invention as long as the contact lens exhibits a warpage tolerance not greater than 0.10 mm.

We claim:

1. A contact lens comprised of an organic cellulose ester selected from the group consisting of cellulose acetate having an acetyl content of 36 to 40 percent by weight of the cellulose acetate, cellulose acetate butyrate having an acetyl content of 11 to 15 weight percent and a butyryl content of 34 to 40, based on the weight of the cellulose acetate butyrate, and cellulose acetate propionate having an acetyl content of 2 to 9 weight percent and a propionyl content of 40 to 49 weight percent, based on the weight of the cellulose acetate propionate, the contact lens characterized by a warpage tolerance not greater than 0.10 mm provided by an antiwarpage treatment wherein the lens material is exposed to an elevated temperature for a predetermined length of time prior to machining and grinding.

2. The contact lens of claim 1 wherein the contact lens is comprised of cellulose acetate butyrate having an acetyl content of 13 to 15 weight percent, based on the weight of the cellulose acetate butyrate, a butyryl content in the range of 36 to 38 weight percent, based on the wieght of the cellulose acetate butyrate, a hydroxyl content in the range of 1.5 to 2.5 weight percent, based on the weight of the cellulose acetate butyrate, and a viscosity in the range of 17 to 28 seconds as determined by the Ball-Drop Method, ASTM Designation D-1343, Formula A, the contact lens characterized by a warpage tolerance in the range of 0 to 0.04 mm.

3. A contact lens comprised of an organic cellulose ester selected from the group consisting of cellulose acetate, cellulose acetate butyrate and cellulose acetate propionate, the contact lens characterized by a warpage tolerance not greater than 0.10 mm provided by an antiwarpage treatment wherein the lens material is exposed to an elevated temperature for a predetermined length of time prior to machining and grinding.

* * * * *